(12) United States Patent
Toyota

(10) Patent No.: US 6,693,993 B2
(45) Date of Patent: Feb. 17, 2004

(54) EMERGENCY NOTIFICATION AND RESCUE REQUEST SYSTEM

(75) Inventor: Katsunori Toyota, Tokyo (JP)

(73) Assignee: Kabushiki Kaisha Alpha Tsushin, Tokyo (JP)

( * ) Notice: Subject to any disclaimer, the term of this patent is extended or adjusted under 35 U.S.C. 154(b) by 0 days.

(21) Appl. No.: 10/138,361

(22) Filed: May 2, 2002

(65) Prior Publication Data
US 2003/0099331 A1 May 29, 2003

(30) Foreign Application Priority Data
Nov. 28, 2001 (JP) .......................... 2001-362836

(51) Int. Cl.⁷ .................. H04M 11/04; H04M 3/22; H04M 1/00
(52) U.S. Cl. .............................. 379/38; 379/51; 379/69; 379/351; 379/372; 379/386; 340/573.1
(58) Field of Search ................ 379/37–51, 69, 379/257, 229, 237, 372, 386, 351, 282, 283, 80; 704/231, 243; 340/573.1, 573.4, 531

(56) References Cited

U.S. PATENT DOCUMENTS

| | | | |
|---|---|---|---|
| 4,492,820 A | | 1/1985 | Kennard et al. ............... 179/5 |
| 4,667,065 A | * | 5/1987 | Bangerter .................... 379/351 |
| 5,450,484 A | * | 9/1995 | Hamilton ..................... 379/351 |
| 2001/0026221 A1 | * | 10/2001 | Toyota ..................... 340/573.1 |

* cited by examiner

Primary Examiner—Wing F Chan
(74) Attorney, Agent, or Firm—MacPherson Kwok Chen & Heid LLP

(57) ABSTRACT

In an emergency notification and rescue request system having an answer detector for detecting a call receiving party's answer to a telephone call, the answer detector comprises a level detector for outputting a first signal when a level of an audio signal on a telephone line is greater than a prescribed level and otherwise outputting a second signal which is different from the first signal, wherein an interval between adjacent prescribed state changes in the output signal from the level detector is computed every time the prescribed state change is detected, and the current and previous intervals are compared so that if such an event that the current and previous intervals do not substantially correspond to each other has occurred prescribed times consecutively, it is determined that no regular signals such as the busy signal or ring signal exist on the telephone line, i.e., the call receiving party has answered the telephone call.

8 Claims, 4 Drawing Sheets

EMERGENCY NOTIFICATION AND RESCUE REQUEST SYSTEM

TECHNICAL FIELD

The present invention relates to an emergency notification and rescue request system for transmitting a rescue request message to predesignated call receiving parties via telephone line when a situation requiring a rescue effort arises. Particularly, the present invention relates to an emergency notification and rescue request system which is suitable for use in households including blind, handicapped, ill or otherwise infirm members.

BACKGROUND OF THE INVENTION

Households including infirm members may need to call for help to rescue teams and neighbors in case of an accident or a sudden worsening of a sickness. Such household members may not be able to call for help by their own efforts.

In order to solve such a problem, the co-pending U.S. patent application Ser. No. 09/745,975 has proposed an emergency notification and rescue request system for, in response to various emergency situations, automatically dialing one or a plurality of call receiving parties designated to each emergency situation to thereby notify the occurrence of the emergency situation and request rescue efforts. This system comprises a memory capable of storing a plurality of rescue request messages and can assign one or more of the plurality of rescue request messages to each of the combinations of call receiving parties and emergency situations (or corresponding input terminals) so that it is possible to easily conduct emergency notification and rescue request operations with an optimum message depending on a particular combination of emergency situations and call receiving parties.

In such an emergency notification and rescue request system, it is important to transmit the rescue request messages after it is detected that the call receiving party has answered the call. Typically, such detection of the call receiving party's answer to the call is done by detecting reversal in voltage polarity of the telephone line. However, in the case that a private line is used by the call receiving party as by the fire station, the line polarity reversal may not occur when the call is answered, and this makes it impossible to detect the answer to the telephone call based on the line voltage polarity.

The U.S. Pat. No. 4,492,820 issued to Kennard, et al. has disclosed a telephone alarm device that can detect the call receiving party's answer to the call even when the line polarity change may not take place. This device comprises a level detector for detecting the presence or absence of audio signals on the telephone line and outputting a signal indicating the presence or absence of the audio signals on the line, a CPU for storing the length of each audio signal in a RAM according to the signal from the level detector, and a ROM for storing time standards. The CPU compares the length of the audio signals with the time standards, and according to the comparison, determines whether the audio signal received is a busy signal, a telephone ring signal or an "odd count" signal. When a predetermined number of the odd count signals are identified, it is determined that the call has been answered by the call receiving party.

In this telephone alarm device, in order to identify the audio signal as the busy signal, ring signal or "odd count" signal, it is necessary to prepare beforehand special data such as the "time standards." However, the length (or duty cycle) and/or period of the ring signal, for example, can vary depending on a switching system (or switching center) relating to a particular call, and thus, different "time standards" may be required for different switching systems. When appropriate time standards are not set, the answer detection by the telephone alarm device may not properly function.

BRIEF SUMMARY OF THE INVENTION

In view of such problems of the prior art, a primary object of the present invention is to provide an emergency notification and rescue request system having a versatile answer detecting function that can reliably detect an answer to a call even in the case that the ring signal can vary for each call and the line polarity change may not take place when the call is answered.

A second object of the present invention is to provide an emergency notification and rescue request system having an answer detecting function that can detect an answer to a call without requiring special data even when the line polarity change may not take place when the call is answered.

According to the present invention, such objects can be accomplished by providing an emergency notification and rescue request system, comprising: one or a plurality of input terminals for receiving signals from one or a plurality of sensors or from a transmitter operable by a user; an automatic telephone dialer capable of selectively making a telephone call to a plurality of call receiving parties; a memory for storing one or a plurality of rescue request messages; and an answer detector for detecting an answer by a call receiving party to which a telephone call was made, wherein in response to a signal input to any one of the plurality of input terminals, the system makes a telephone call to one or more call receiving parties set for the input terminal and when detecting an answer from the call receiving party, the system transmits one or more rescue request messages assigned to the call receiving party, and wherein the answer detector comprises: a level detector for outputting a first signal when a level of an audio signal on a telephone line is greater than a prescribed level and otherwise outputting a second signal which is different from the first signal; means for computing, in response to a prescribed state change in the output signal from the level detector, an interval between a current prescribed signal state change and a previous prescribed signal state change; a counter for indicating a number of consecutive events that a current interval computed by the computing means does not substantially correspond to a previous interval computed by the computing means; and means for determining that the call receiving party has answered the telephone call when the number indicated by the counter is equal to a prescribed value. The prescribed change in the output signal from the level detector may be a change from the first signal to the second signal or from the second signal to the first signal.

Thus, in this system, an interval between adjacent prescribed state changes in the output signal from the level detector is computed every time the prescribed state change is detected, and the current and previous intervals are compared so that if such an event that the current and previous intervals do not substantially correspond to each other has occurred prescribed times consecutively, it is determined that no regular signals such as the busy signal or ring signal exist on the telephone line, i.e., the call receiving party has answered the telephone call. Therefore, even when the busy signal and/or ring signal may vary depending on the switching systems, so long as the signals are regular (or periodic), it is possible to detect the call receiving party's answer to the telephone call without need for preparing the special data. Such an answer detection does not rely upon the polarity reversal of the line voltage, and thus, even in the case that a private line is used by the call receiving party as by the fire station, for example, and the line polarity reversal may not take place, the answer to the telephone call can be detected. Thus, it is ensured that the rescue request messages are transmitted after the call receiving party has answered the call, thereby allowing for reliable and effective information delivery and contributing to quick start of rescue efforts.

The above emergency notification and rescue request system may further comprise additional means for determining that the call receiving party has answered the telephone call when the level detector has continuously outputted the first signal for a prescribed period of time.

According to another aspect of the present invention, there is provided a method for notifying an emergency and requesting rescue, comprising the steps of: in response to a prescribed input signal, making a telephone call to one or more call receiving parties assigned to the input signal; detecting that the call receiving party has answered the telephone call; transmitting one or more rescue request messages assigned to the call receiving party when the step of detecting indicates that the call receiving party has answered the telephone call; wherein the step of detecting comprises the steps of: monitoring an output signal from a level detector that outputs a first signal when a level of an audio signal on a telephone line is greater than a prescribed level and otherwise outputs a second signal which is different from the first signal; computing, in response to a prescribed state change in the output signal from the level detector, an interval between a current prescribed signal state change and a previous prescribed signal state change; counting a number of consecutive events that a current interval computed by the computing means does not substantially correspond to a previous interval computed by the computing means; and determining that the call receiving party has answered the telephone call when the counted number is equal to a prescribed value.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
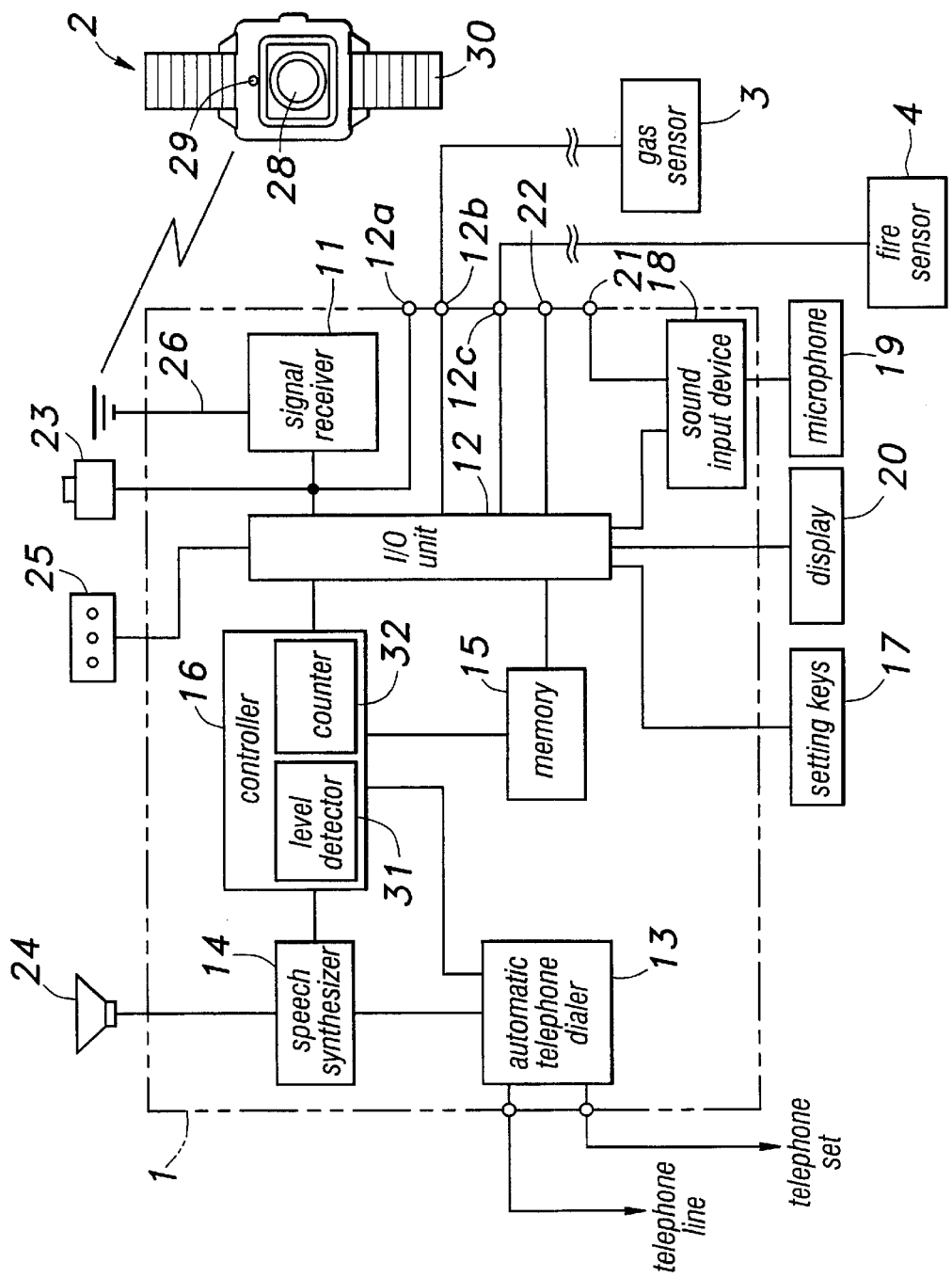
FIG. 1 is a block diagram of an emergency notification and rescue request system according to the present invention.

FIG. 1 is a block diagram for showing a configuration of an emergency notification and rescue request system to which the present invention is applied. This emergency notification and rescue request system comprises a main body 1 (see FIGS. 2a and 2b) to be placed in a room and connected to a telephone line, and a portable radio signal transmitter 2 of a wristwatch-type.

The main body 1 is provided with a built-in radio signal receiver 11 for receiving a radio signal from the portable signal transmitter 2. The signal receiver 11 is connected to an input/output unit 12 in parallel with an input terminal 12a that is provided on an underside 1b of the main body 1. The input/output unit 12 is further provided with an input terminal 12b connected to a gas sensor 3 positioned at an appropriate place in the house and an input terminal 12c connected to a fire sensor 4 also positioned at an appropriate place in the house (see also FIG. 2b).

The main body 1 further comprises: an automatic telephone dialer 13 for, in response to a signal from the gas sensor 3, fire sensor 4 or portable signal transmitter 2, making a telephone call to predetermined call receiving parties; a memory device 15, which may consist of an IC chip or the like, for storing a plurality of telephone numbers to be dialed and a plurality of rescue request messages (emergency messages) as well as various settings later described; a speech synthesizer 14 for converting the digitally stored messages into an analogue form for transmission to call receiving parties; and a controller 16 for selecting the call receiving parties and the transmitted messages depending on the signal input to the input/output unit 12 and controlling the automatic telephone dialer 13 and the speech synthesizer 14 to execute the emergency notification and rescue request operation.

The rescue request messages stored in the memory device 15 may preferably comprise first category messages, such as "please help me", "gas leak occurred", "fire occurred", and "there is an illegal intrusion," that are prepared at the manufacturing factory (but are preferably variable by the user) and mainly indicate the type of emergency and second category messages containing the name, address, telephone number, etc. of the user. The second category messages are typically recorded by the user when setting up the system. Also, the first category messages may further comprise messages indicating additional information of the user, such as "I have a hearing impairment" or "I am physically handicapped." By suitably selecting one or more of these messages according to the type of emergency and the call receiving party, it is possible to conduct the rescue request operation with the optimum message(s). Such assignment of the messages can be accomplished, for example, by associating a particular number to each one of the messages beforehand and using setting keys 17 provided underside of the main body 1 (see FIG. 2b) to input the number of the desired message(s) in a suitable area of a matrix table shown on a display 20 and representing the combinations of the input terminals and call receiving parties. The display is also provided underside of the main body 1.

As described in detail later, in order to constitute an answer detector for detecting that the call receiving party has answered the telephone call, the controller 16 comprises a level detector 31 for detecting audio signals on the telephone line that are above a prescribed level so as to output a first signal (for example, "1" or "High") when the audio signal is above the prescribed level and otherwise output a second signal (for example, "0" or "Low") that is different from the first signal, and a counter 32. As the level detector 31, it is possible to use the one adopted in an IC recorder or the like having a VOX (voice operated device) function. The counter 32 can be preferably implemented as a function of a CPU (microprocessor) which also implements other functions of the controller 16.

Figure 2B:
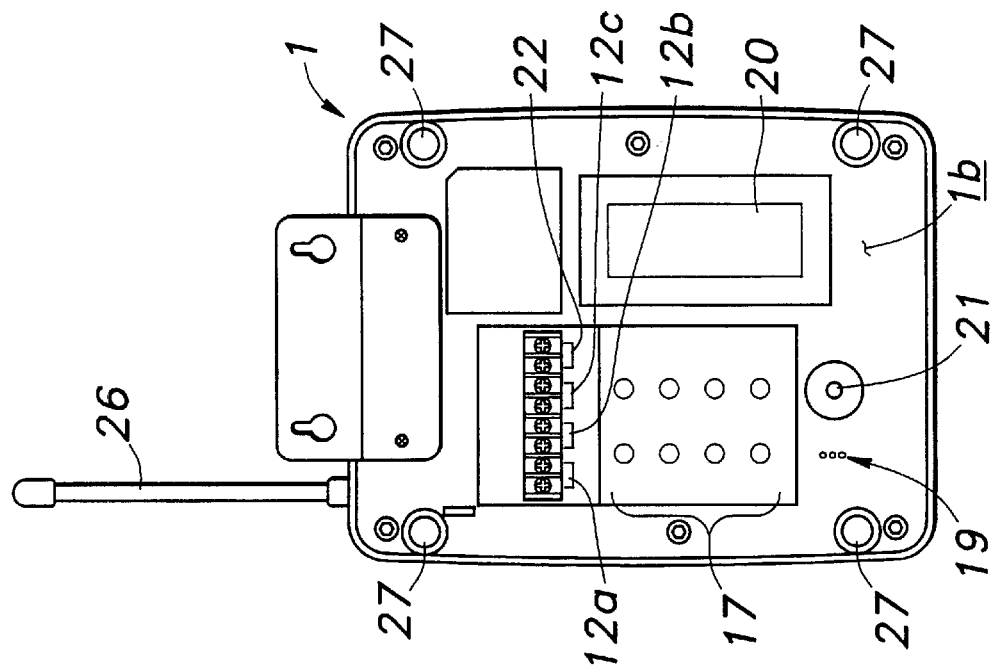
FIG. 2a shows a top side of a main body of the emergency notification and rescue request system and FIG. 2b shows an underside of the same.

In addition to the monitor display 20 and the setting keys 17 used for setting call receiving parties (or entering their telephone numbers) for each of the input terminals 12a, 12b and 12c and assigning rescue request messages for each call receiving party set for each input terminal, the main body 1 is equipped with a sound input device 18 comprising a microphone 19. As shown in FIG. 2b, the setting keys 17, microphone 19 and the display 20 are provided on the usually hidden underside 1b of the main body 1 to prevent inadvertent or false operation thereof.

Figure 2A:
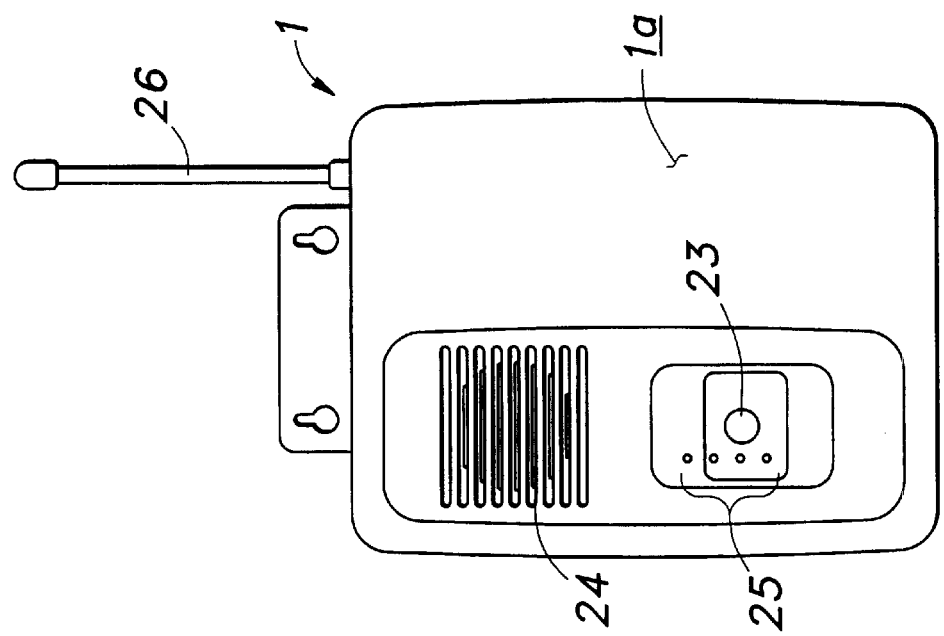

An external input terminal 21 connected to the sound input device 18 is also provided on the underside 1b of the main body 1 so as to allow a message to be input from a recording device such as a tape recorder. An output terminal 22 is provided adjacent to the input terminals 12a, 12b and 12c for making it possible to, in response to a signal input to the input/output unit 12, operate an alarm sound emitter and/or a flashing light unit placed outside the room or house in which the main body 1 is situated. The input terminal 12a is provided to allow an additional sensor or the like to be connected in parallel with the built-in signal receiving device 11. Further, a push button switch 23, which is provided on a top side 1a of the main body 1 as shown in FIG. 2a, is connected to the input/output unit 12 in parallel with the signal receiving device 11 and the input terminal 12a so that pressing the switch 23 will trigger the same emergency notifying operation as that triggered by pressing a push button switch 28 of the portable transmitter 2. Also provided on the top side 1a of the main body 1 are a speaker 24 connected to the speech synthesizer 14 so as to allow the user to check the rescue request message when the user sets the message or when the message is transmitted to a call receiving party, and an indicator 25 for indicating the call receiving party during message transmission.

A reference numeral 26 in FIGS. 2a and 2b designates an antenna connected to the signal receiving device 11, and a reference numeral 27 in FIG. 2b designates rubber feet functioning as spacers for preventing the setting keys 17, microphone 19 and display 20 from contacting the surface on which the main body 1 is fixed.

The portable transmitter 2 is provided with a transmission indicator lamp 29 consisting of an LED or the like in addition to the transmission switch 28. When the transmission switch 28 is pressed by the user, a radio signal is transmitted to the signal receiving device 11 and at the same time the transmission indicator lamp 29 is turned on and off. The portable transmitter 2 is also equipped with an elastic stainless band 30 so that the transmitter 2 can be always worn on a wrist of the user.

The above constructed emergency notification and rescue request system operates in response to a signal input to the input terminals 12a, 12b and 12c to make a telephone call to one or a plurality of call receiving parties assigned to each of the input terminals by using the automatic telephone dialer 13 and transmit the rescue request messages, thereby notifying the call receiving parties of the emergency situation and giving them information necessary or helpful to carry out rescue efforts. In such an operation, by assigning one or more of the plurality of rescue request messages stored in the memory 15 to each combination of the input terminals and call receiving parties, it is possible to call for help with the message or information properly adapted for the emergency situation as well as the call receiving party. It should be noted, however, that in order to make such message transmission through the telephone line effective, the message transmission need be conducted after the telephone call has been answered by the call receiving party.

Figure 3:
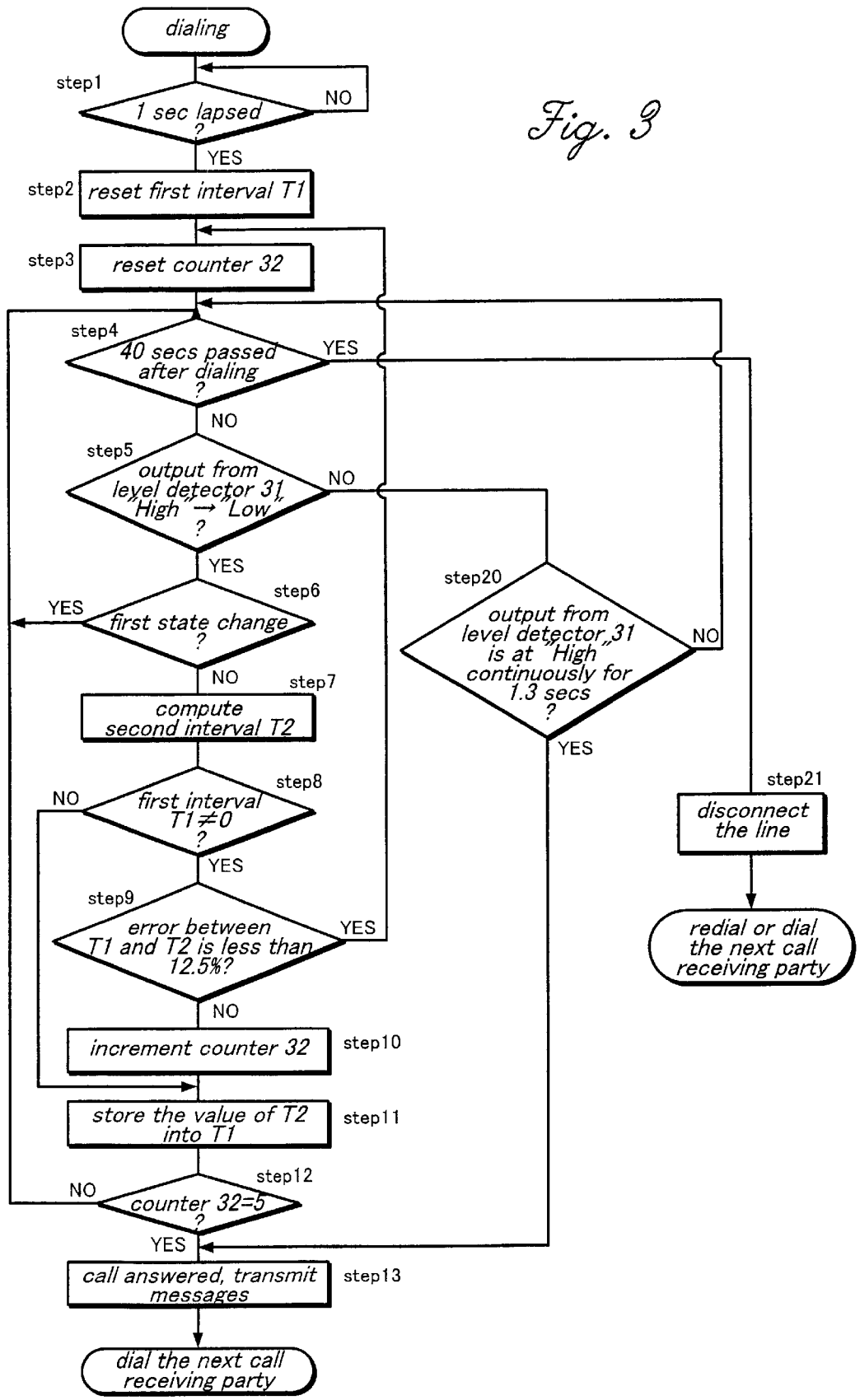
FIG. 3 is a flowchart showing a way of detecting an answer to a call in the emergency notification and rescue request system according to the present invention.

According to the present invention, detection of the answer to the telephone call can be achieved by determining when a signal having a regular period such as the busy signal or ring signal has ceased to be detected. FIG. 3 is a flowchart showing a preferred embodiment of the answer detection method according to the present invention.

As shown in FIG. 3, when a dialing operation to a call receiving party is completed, the process waits in step 1 for a prescribed period of time (e.g., one second) to lapse, and then proceeds to step 2 to initialize or reset the value of (or putting zero into) a first state change-state change interval T1 (hereinafter referred to as "first interval") which will be described in detail later. Then the process goes to step 3 where the counter 32 is reset to zero.

Further, in step 4, it is determined whether or not a prescribed period of time (e.g., 40 seconds) has passed since the completion of dialing, and if 40 seconds have not lapsed, the process goes to step 5 and if 40 seconds have passed indicating that the answer to the call has not been detected by then, the process goes to step 21. It should be noted that step 1 for suspending the process for one second after the completion of dialing is provided to ensure that the line connection by the switching system is completed before examining the signal on the telephone line.

In step 5, it is determined whether or not there is a prescribed state change (a change from High to Low (or "falling edge") in this embodiment) in the output from the level detector 31, and if there is, the process goes to step 6, and otherwise goes to step 20.

In step 6, it is checked whether the prescribed state change in the output from the level detector 31 is the first one. If this is the case, the process returns to step 4, and if not (or if there is a previous state change from High to Low), the process proceeds to step 7.

In step 7, a period of time between the current and previous prescribed state changes in the output from the level detector 31 is computed and stored as a second state change-state change interval (hereinafter referred to as "second interval") T2. Subsequently, the process proceeds to step 8.

Step 8 determines whether the value of the first interval T1 is equal to zero or not, and if not the process proceeds to step 9. If the value of the first interval T1 is equal to zero (i.e., remains in the initialized state), the process goes to step 11.

In step 9, the first and second intervals (i.e., the previous and current intervals) T1, T2 are compared to determine if they substantially correspond to each other. This can be done for example by computing $|T2-T1|/T1$ and determining if the value thereof is equal to or smaller than a predetermined value (for example, 12.5%). When it is determined that the first and second intervals T1, T2 are substantially equal (or when $|T2-T1|/T1 \leq 12.5\%$), the process goes back to step 3 to reset the counter 32, and otherwise proceeds to step 10 to increment the counter 32 and goes to step 11.

In step 11, the value of the second interval T2 is stored in the first interval T1 to prepare for the next state change from High to Low in the output signal from the level detector 31.

According to the hitherto described process, it should be noted that when the first interval T1 and the second interval T2 are compared in step 9, the first interval T1 represents the previously computed state change-state change interval and the second interval T2 represents the currently computed state change-state change interval. It should be also noted that the value of the counter 32 represents how many times the event of mismatch between the previous and current intervals (or first and second intervals) T1, T2 has occurred consecutively.

Subsequently, in step 12, it is checked if the value of the counter 32 is equal to a prescribed value (e.g., five). If this is the case, it is determined that the signal on the line is not periodic, in other words, there has been an answer to the telephone call, and the process proceeds to step 13. If not (i.e., when the value of the counter 32 is smaller than the prescribed value), the process returns to step 4. In step 13, one or more rescue request messages set for the call receiving party and the emergency situation are transmitted to the call receiving party.

Step 20 checks whether the output of the level detector 31 indicating the presence of an audio signal above the prescribed level on the telephone line (i.e., "High" in this embodiment) has continued for a prescribed period of time, and if this is the case, the process determines that there has been an answer to the telephone call and goes to step 13, and otherwise goes back to step 4. In the exemplary case that the ring signal comprises alternate silent (or audio signal-nonexistent) period of two seconds and tone (or audio signal-existent) period of one second, the prescribed period of time in step 20 can be preferably set at 1.3 seconds, which is sufficiently longer than the tone period, although the prescribe period may be set at a longer time (such as five seconds) to cope with different switching systems that may provide different ring signals.

The cases that the process goes back to step 4 from step 20 may include the case where the level detector 31 is continuously outputting a signal indicating absence of an audio signal above the prescribed level on the telephone line (i.e., "Low" in this embodiment). When such a condition has continued for a prescribe period of time (for example, 40 seconds), it is determined in step 4 that some abnormality exists and the process goes to step 21 where the line is disconnected and then, dialing is made either to the current call receiving party again or to the next call receiving party in the sequence. An upper limit to the number of redialing to one call receiving party may be determined beforehand. Also, the prescribed period of time used in step 4 can be arbitrarily set by the user.

As described above, according to the present invention, an interval between adjacent prescribed state changes in the output signal from the level detector is computed every time the prescribed state change is detected, and the current and previous intervals are compared so that if such an event that the current and previous intervals do not substantially correspond to each other has occurred prescribed times consecutively, it is determined that no regular signals such as the busy signal or ring signal exist on the telephone line, i.e., the call receiving party has answered the telephone call. Additionally, when the level detector has continuously produced an output signal indicating the presence of an audio signal greater than the prescribed level on the telephone line, it is also determined that there are no regular signals such as the busy signal or ring signal exist on the telephone line and therefore the call receiving party has answered the telephone call. Thus, even when the busy signal and/or ring signal may vary depending on the switching systems, so long as the signals are regular (or periodic), it is possible to detect the call receiving party's answer to the telephone call without need for preparing the special data. Such an answer detection does not rely upon the polarity reversal of the line voltage, and thus, even in the case that a private line is used by the call receiving party as by the fire station, for example, and the line polarity reversal may not take place, the answer to the telephone call can be reliably detected.

By sending rescue request messages after it is detected by using the above described process that the call receiving party has answered the telephone call, the emergency situation can be reliably and effectively notified to the call receiving party.

Figure 4:
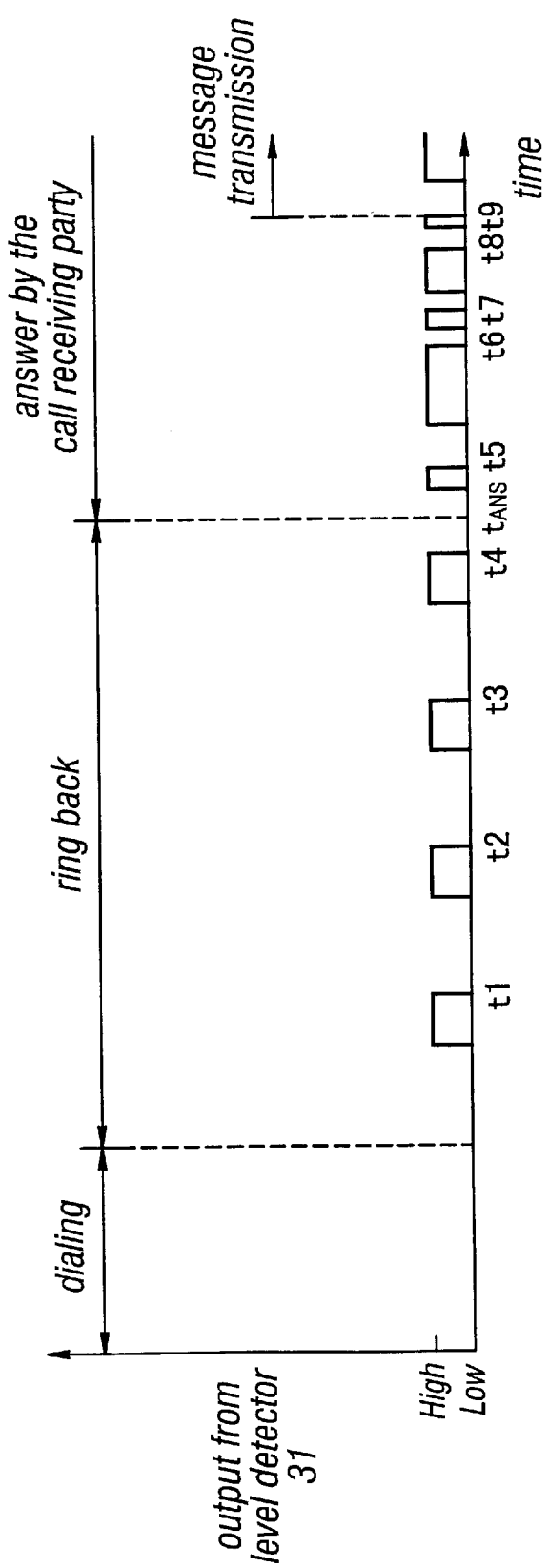
FIG. 4 is a timing chart for schematically showing an example of output signals from a level detector 31 for the purpose of explaining the way of answer detection by the emergency notification and rescue request system according to the present invention.

FIG. 4 is a timing chart for schematically showing an example of the output signal from the level detector 31 for concretely explaining the above described answer detecting process. In this drawing also, "High" indicates existence of an audio signal above a prescribed level on the line and "Low" indicates non-existence of the same. As seen, at time t1, the first state change from High to Low takes place. Then, the second High to Low change takes place at time t2 and the third at time t3. Thus, the first interval T1 is computed as t2−t1 while the second interval T2 is computed as t3−t2. At this point, the call receiving party has not answered the telephone yet and there is a ring signal on the line, resulting in T1=T2 and no increment in the value of the counter 32. This also applies to time t4 where the fourth prescribed state change takes place.

When the call receiving party answers the phone at $t_{ANS}$ and begins to speak to the phone, the output from the level detector 31, which has been hitherto periodic, becomes non-periodic. Consequently, at time t5 where the fifth High to Low state change takes place, the second interval T2 (=t5−t4) is much shorter than the first interval T1 (=t4−t3), with a result that the first and second intervals T1, T2 do not substantially correspond to each other, incrementing the counter 32. At time t6 where the next prescribed state change takes place, the second interval T2 (t6−t5) is greater than the first interval T1 (t5−t4), additionally incrementing the counter 32. In the shown example, at times t7, t8, t9 also, the counter 32 is incremented in the similar fashion, and as a result, the value of the counter 32 reaches five at time t9 and it is determined that the call receiving party has answered the telephone call, and accordingly allowing the message to be transmitted.

As described above, according to the present invention there is provided an emergency notification and rescue request system having a versatile answer detecting function that can reliably detect an answer to a telephone call even in the case that the line polarity change may not take place when the call is answered and the ring signal can vary depending on the switching system handling the telephone call.

Also, the present invention can achieve an emergency notification and rescue request system having an answer detecting function that can detect an answer to a telephone call without requiring special data such as "time standards" for evaluating the output signal from the level detector.

Such an emergency notification and rescue request system can allow the rescue request messages to be sent after the call receiving party has answered the phone call, thus ensuring a reliable message transmission and contributing to quick start of rescue efforts.

Although the present invention has been described in terms of a preferred embodiment thereof, it is obvious to a person skilled in the art that various alterations and modifications are possible without departing from the scope of the present invention which is set forth in the appended claims.

What is claimed is:

1. An emergency notification and rescue request system, comprising:

one or a plurality of input terminals for receiving signals from one or a plurality of sensors or from a transmitter operable by a user;

an automatic telephone dialer capable of selectively making a telephone call to a plurality of call receiving parties;

a memory for storing one or a plurality of rescue request messages; and an answer detector for detecting an answer by a call receiving party to which a telephone call was made, wherein in response to a signal input to any one of the plurality of input terminals, the system makes a telephone call to one or more call receiving parties set for the input terminal and when detecting an answer from the call receiving party, the system transmits one or more rescue request messages assigned to the call receiving party, and wherein the answer detector comprises:

a level detector for outputting a first signal when a level of an audio signal on a telephone line is greater than a prescribed level and otherwise outputting a second signal which is different from the first signal;

means for computing, in response to a prescribed state change in the output signal from the level detector, an interval between a current prescribed signal state change and a previous prescribed signal state change;

a counter for indicating a number of consecutive events that a current interval computed by the computing means does not substantially correspond to a previous interval computed by the computing means; and means for determining that the call receiving party has answered the telephone call when the number indicated by the counter is equal to a prescribed value.

2. An emergency notification and rescue request system according to claim 1, wherein the prescribed change in the output signal from the level detector is a change from the first signal to the second signal.

3. An emergency notification and rescue request system according to claim 1, wherein the prescribed change in the output signal from the level detector is a change from the second signal to the first signal.

4. An emergency notification and rescue request system according to claim 1, further comprising additional means for determining that the call receiving party has answered the telephone call when the level detector has continuously outputted the first signal for a prescribed period of time.

5. A method for notifying an emergency and requesting rescue, comprising the steps of:

in response to a prescribed input signal, making a telephone call to one or more call receiving parties assigned to the input signal;

detecting that the call receiving party has answered the telephone call;

transmitting one or more rescue request messages assigned to the call receiving party when the step of detecting indicates that the call receiving party has answered the telephone call;

wherein the step of detecting comprises the steps of:

monitoring an output signal from a level detector that outputs a first signal when a level of an audio signal on a telephone line is greater than a prescribed level and otherwise outputs a second signal which is different from the first signal;

computing, in response to a prescribed state change in the output signal from the level detector, an interval between a current prescribed signal state change and a previous prescribed signal state change;

counting a number of consecutive events that a current interval computed by the computing means does not substantially correspond to a previous interval computed by the computing means; and determining that the call receiving party has answered the telephone call when the counted number is equal to a prescribed value.

6. A method for notifying an emergency and requesting rescue according to claim 5, wherein the prescribed change in the output signal from the level detector is a change from the first signal to the second signal.

7. A method for notifying an emergency and requesting rescue according to claim 5, wherein the prescribed change in the output signal from the level detector is a change from the second signal to the first signal.

8. A method for notifying an emergency and requesting rescue according to claim 5, wherein the step of detecting further comprises a step of determining that the call receiving party has answered the telephone call when the level detector has continuously outputted the first signal for a prescribed period of time.

* * * * *